United States Patent
Rasztovits-Wiech

(10) Patent No.: US 7,412,167 B2
(45) Date of Patent: Aug. 12, 2008

(54) SYSTEM AND METHOD FOR LIMITING THE TRANSMISSION CAPACITY ON A DATA TRANSMISSION PATH

(75) Inventor: Michael Rasztovits-Wiech, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 457 days.

(21) Appl. No.: 10/348,373

(22) Filed: Jan. 21, 2003

(65) Prior Publication Data

US 2003/0180043 A1    Sep. 25, 2003

(30) Foreign Application Priority Data

Jan. 21, 2002 (DE) .................. 102 02 143

(51) Int. Cl.
*H04J 14/02* (2006.01)
(52) U.S. Cl. .......................... 398/34; 398/97
(58) Field of Classification Search ................ 398/141, 398/142, 140, 30–34, 97
See application file for complete search history.

(56) References Cited

U.S. PATENT DOCUMENTS

| 4,696,063 | A |   | 9/1987  | Schembri |
| 4,777,663 | A |   | 10/1988 | Charlton |
| 4,890,893 | A | * | 1/1990  | Smoot ........................ 398/34 |
| 5,463,487 | A | * | 10/1995 | Epworth ...................... 398/79 |
| 5,600,473 | A | * | 2/1997  | Huber ......................... 398/87 |
| 5,861,980 | A | * | 1/1999  | Ono ....................... 359/337.12 |
| 5,982,516 | A | * | 11/1999 | Murphy et al. ............... 398/51 |
| 6,449,073 | B1 | * | 9/2002 | Huber ......................... 398/82 |
| 6,453,033 | B1 | * | 9/2002 | Little et al. ................. 379/219 |
| 6,563,615 | B2 | * | 5/2003 | Milton et al. .................. 398/1 |
| 6,754,018 | B2 | * | 6/2004 | Takahashi ..................... 360/53 |
| 6,862,322 | B1 | * | 3/2005 | Ewen et al. ................. 375/316 |
| 6,895,190 | B1 | * | 5/2005 | Neumann et al. ........... 398/202 |
| 2003/0002108 | A1 | * | 1/2003 | Ames et al. ................. 359/152 |
| 2003/0048508 | A1 | * | 3/2003 | Yu et al. ..................... 359/133 |
| 2003/0067662 | A1 | * | 4/2003 | Brewer et al. ............... 359/189 |

FOREIGN PATENT DOCUMENTS

| EP | 0 236 432 | 9/1987 |
| EP | 0 272 911 | 6/1988 |
| EP | 0 403 455 | 12/1990 |

* cited by examiner

*Primary Examiner*—Leslie Pascal
(74) *Attorney, Agent, or Firm*—Bell, Boyd & Lloyd LLP

(57) ABSTRACT

A system and method are disclosed for providing a transmission capacity on a data transmission path, wherein such data transmission capacity is provided with regard to a user on a transmission path by using at least one limiting unit.

8 Claims, 2 Drawing Sheets

SYSTEM AND METHOD FOR LIMITING THE TRANSMISSION CAPACITY ON A DATA TRANSMISSION PATH

BACKGROUND OF THE INVENTION

The present invention relates to a system and an associated method for providing data transmission capacity on a data transmission path which is arranged between at least one transmitting unit and at least one receiving unit.

Telecommunications landline network operators with their own transmission media, such as glass fiber cables, do not always use all the transmission media, particularly transmission lines, which are available for them. Unused transmission capacities in glass fibers can then, for example, be rented to third parties. For example, a transmission capacity of 1.6 Tbit/s can be achieved in monomode fibers on a glass fiber transmission path, which is also referred to as a dark fiber in the following text, which is not terminated by transmission devices.

The present invention is, therefore, directed toward a system and a method to prevent the misuse of free data transmission capacities in a transmission medium.

SUMMARY OF THE INVENTION

Accordingly, in an embodiment of the present invention, a system is disclosed for providing a data transmission capacity on a data transmission path, which is arranged between at least one transmitting unit and at least one receiving unit, wherein at least one limiting unit is arranged between the transmitting unit and the receiving unit which analyzes a data stream which is interchanged between the transmitting unit and the receiving unit and limits the data transmission capacity of the data stream on a user-related basis.

In an embodiment, the data transmission path is formed by at least one glass fiber line.

In an embodiment, the limiting unit includes a coupling unit, an optical spectrum analyzer and a comparator unit, wherein the coupling unit outputs parts of an optical transmission signal which is carried on the glass fiber line to the optical spectrum analyzer controlled by a unit, determines a number of transmitted wavelength multiplexed channels and, if a value in the comparator unit is exceeded, influences the optical transmission signal as a function of the bit rate of the optical transmission signal.

In an embodiment of the present invention, a method is disclosed for providing a data transmission capacity on a data transmission path which is arranged between at least one transmitting unit and at least one receiving unit, wherein the data transmission capacity of the data stream which is interchanged on the data transmission path is limited on a user-related basis.

In an embodiment of the method, parts of the optical transmission signal, which are carried on the glass fiber line, are output, a number of transmitted wavelength multiplexed channels are determined, and the optical transmission signal is influenced if a predetermined value is exceeded.

The present invention results in the advantage that the data transmission capacity is limited as a function of the requirements of a lessee, so that it is possible to define a rental price based on performance.

The present invention also results in the advantage that it can be achieved in a relatively simple way.

Additional features and advantages of the present invention are described in, and will be apparent from, the following Detailed Description of the Invention and the Figures.

DETAILED DESCRIPTION OF THE INVENTION

Figure 1:
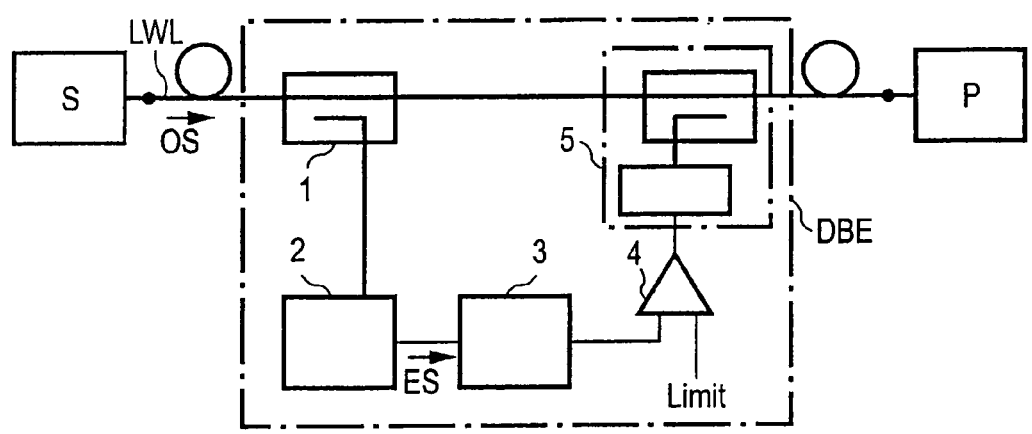
FIG. 1 shows an embodiment for limiting the transmitting capacity illustrated by a block diagram of a glass fiber path with a limiter unit.
Figure 2:
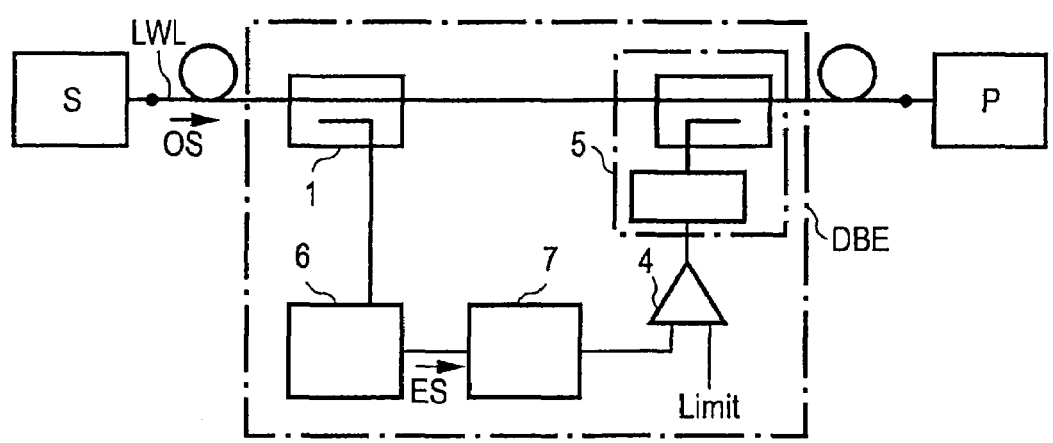
FIG. 2 shows an embodiment for limiting the transmitting capacity illustrated by a block diagram of a glass fiber path with a limiter unit.

FIG. 1 shows a data transmission path, particularly a glass fiber or optical waveguide transmission path LWL, between a transmitting unit S and a receiving unit P. The data rate limiting unit DBE in this embodiment has an optical coupler 1 which outputs a part of the optical transmission signal OS and supplies it to an optical receiver 2. This optical receiver 2 may be in the form of an optoelectrical converter. The baseband signal ES which is produced by the optical receiver 2 is used by a bit rate determining device 3 and a comparator 4 to decide whether the transmission signal OS is disturbed or interrupted with the aid of a module 5 which emits a disturbance signal. The coupler in the module 5 can be replaced by a switch. The bit rate determining device 3 can be, for example, in the form of an edge counter or a clock recovery circuit. In one embodiment, the electrical signal ES is applied directly to a counter which, for example, can be reset periodically.

In a further embodiment, the clock signal which corresponds to the data rate could be obtained with the aid of a PLL circuit. This clock signal is then supplied, for example, to a counter. The count of the counter could be monitored with the aid of a comparator. If a count exceeds a maximum value which can be predetermined, then the transmission on the transmission path between the transmitter S and the receiver P is, for example, interrupted or disturbed in such a way that reliable error-free data transmission is no longer ensured.

The disturbances which are produced by the module 5 may be produced either via input coupling or with the aid of an optical switch. In the rest position, this optical switch is switched such that the optical signal is passed on, with the transmission path not being interrupted in the event of an operating voltage failure. The disturbances which are produced by the disturbance component likewise could be produced with the aid of an optical coupler, in which case, for example, a simple laser can be used as the disturbance signal source. The system and the associated method result in the advantage that exclusively passive optical components with little attenuation are used in the path of the transmission signal, and the failure rate of these components is very low. There is, therefore, no need to monitor the circuit arrangement which is inserted into the data transmission line.

In an embodiment of according to the invention, an optical spectrum analyzer 6 and a unit 7 for detecting the number of channels are used instead of the optical receiver 2 and the bit rate determining device 3. The optical spectrum analyzer 6 is, in that case, controlled by the unit for detecting the number of channels, such that the number of optical wavelength multiplexed channels can be detected. If the number of channels is greater than an entered limit, the transmission signal can be interrupted, for example, with the aid of an optical switch. If it is not intended to interrupt the entire transmission path, but only to make it possible to suppress or disturb the transmission of additional channels, the optical switch also may be replaced by input coupling of a wavelength-selected disturbance signal which is produced, for example, with the aid of a tunable laser. The tunable laser deliberately produces those optical frequencies which relate to the additional channels that are to be disturbed.

The optical switch must be in the switched-on rest state in order for the transmission path to not be interrupted in the event of a failure of the operating voltage.

An advantage of this embodiment variant as well is that exclusively passive optical components with little attenuation are used in the path of the transmission signal.

Although the present invention has been described with reference to specific embodiments, those of skill in the art will recognize that changes may be made thereto without departing from the spirit and scope of the present invention as set forth in the hereafter appended claims.

The invention claimed is:

1. A system for limiting a data transmission capacity on a data transmission path on at least one glass fiber line, comprising:
   at least one transmitting unit;
   at least one receiving unit, wherein the data transmission path is arranged between the at least one transmitting unit and the at least one receiving unit for interchanging an optical transmission signal,
   at least one limiting unit, inserted between the at least one transmitting unit and the at least one receiving unit analyzing the optical transmission signal and limiting the transmission capacity on a user-related basis;
   the limiting unit comprising:
   a coupling unit for outputting a part of the optical transmission signal, which is carried on the glass fiber line;
   an optical receiver for converting the outputted part of the optical transmission signal into an electrical transmission signal;
   a bit rate determining device for detecting a bit rate of the electrical transmission signal, wherein the bit rate determining device is one of an edge counter and clock recovery circuit;
   a comparator for comparing the bit rate with a predetermined maximum bit rate; and
   a module, which interrupts or disturbs the optical transmission signal being transmitted to the receiving unit by said optical transmission signal in accordance with a result outputted from the comparator if the bit rate exceeds the predetermined maximum value.

2. The system for limiting the data transmission capacity on a data transmission path as claimed in claim 1, wherein the bit rate determining device is an edge counter.

3. The system for limiting the data transmission capacity on a data transmission path as claimed in claim 1, wherein the bit rate determining device is a clock recovery circuit.

4. A system for limiting a data transmission capacity on a data transmission path on at least one glass fiber line, comprising:
   at least one transmitting unit;
   at least one receiving unit, wherein the data transmission path is arranged between the at least one transmitting unit and the at least one receiving unit for interchanging an optical transmission signal;
   at least one limiting unit, inserted between the at least one transmitting unit and the at least one receiving unit analyzing the optical transmission signal and limiting the transmission capacity on a user-related basis;
   the limiting unit comprising:
   a coupling unit for outputting a part of the optical transmission signal, which is carried on the glass fiber line;
   an optical spectrum analyzer determining the number of channels within the optical transmission signal;
   an unit for detecting a number of channels within the optical transmission signal;
   a comparator for comparing the number of channels with a predetermined limit; and
   a module, which interrupts the optical transmission signal being transmitted to the receiving unit or disturbs channels of said optical transmission signal in accordance with a result outputted from the comparator if the number of channels exceeds a predetermined limit.

5. The system for limiting the data transmission capacity on a data transmission path as claimed in claim 4, wherein the module is designed to interrupt or disturb only additional channels transmitted to the receiving station.

6. A method for limiting a data transmission capacity on a data transmission path, wherein the data transmission path is arranged between the at least one transmitting unit and the at least one receiving unit for interchanging an optical transmission signal, the method comprising:
   outputting a part of the optical transmission signal, converting the outputted optical transmission signal to an electrical transmission signal;
   detecting a bit rate using one of an edge counter and a clock recovery circuit;
   comparing the bit rate with the predetermined maximum bit rate; and
   influencing on a user-related basis the optical transmission signal, which is transmitted to the receiving unit, by interrupting or disturbing said optical transmission signal in accordance with a result of the comparison if the bit rate of the optical transmission signal exceeds the predetermined maximum bit rate.

7. A method for limiting a data transmission capacity on a data transmission path, wherein the data transmission path is arranged between the at least one transmitting unit and the at least one receiving unit for interchanging an optical transmission signal, the method comprising:
   outputting a part of the optical transmission signal;
   detecting a number of channels of the optical transmission signal;
   comparing the number of channels with a predetermined limit; and
   influencing on a user-related basis the optical transmission signal, which is transmitted limit to the receiving unit, by interrupting or disturbing said channels in accordance with a result of the comparison if the number of channels of the optical transmission signal exceeds the predetermined limit.

8. The method for providing the data transmission capacity on a data transmission path as claimed in claim 7, the method further comprising influencing additional channels of the transmission signal if a predetermined limit of channels is exceeded.

* * * * *